Dec. 25, 1951  G. LUBIN ET AL  2,579,503
IMPACT TESTING MACHINE
Filed Feb. 26, 1945  2 SHEETS—SHEET 1
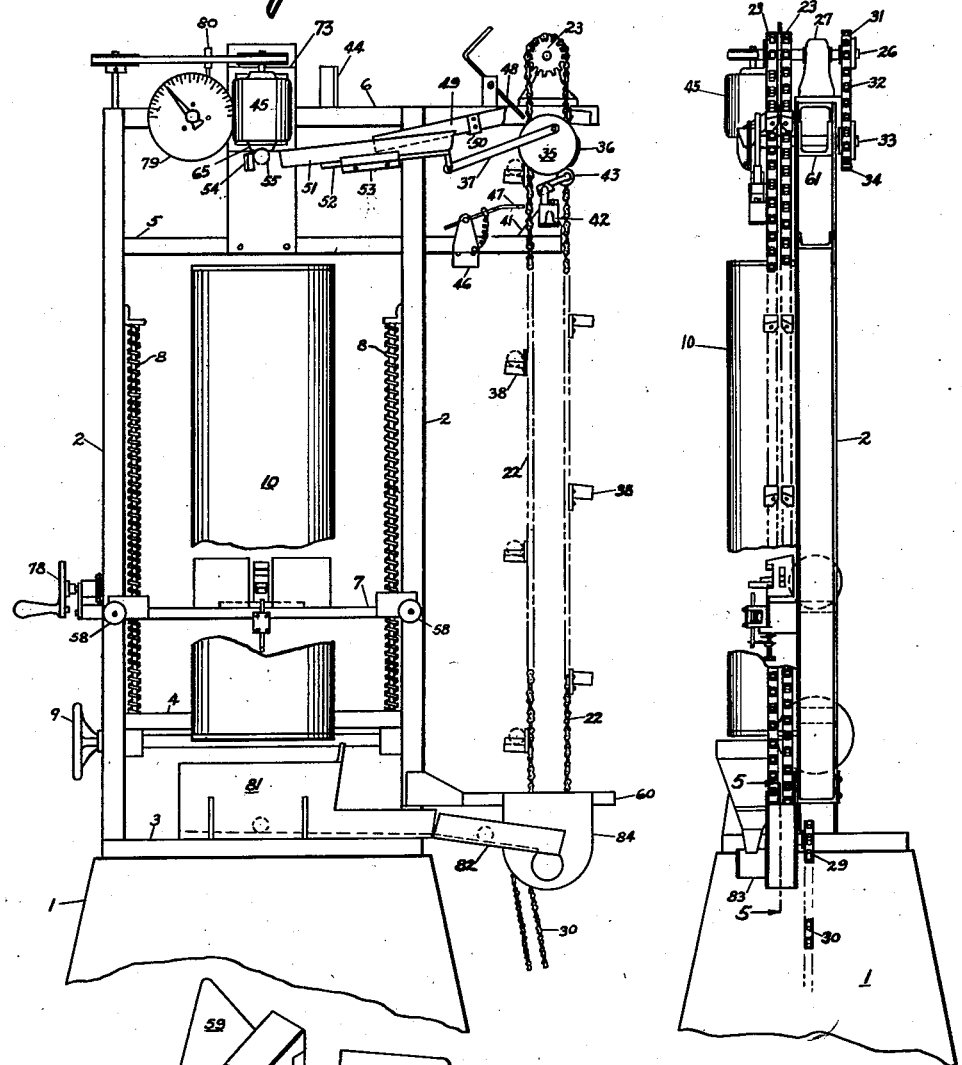
Fig. 1
Fig. 2
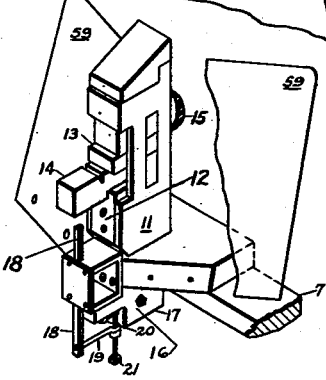
Fig. 3
INVENTOR.
GEORGE LUBIN
and ROSWELL R. WINANS
BY Ralph L. Chappell
ATTORNEY.

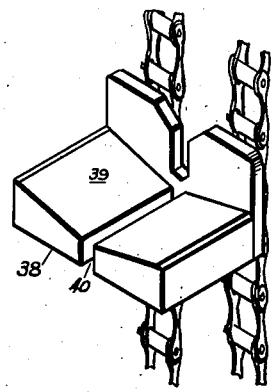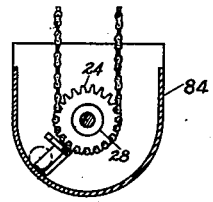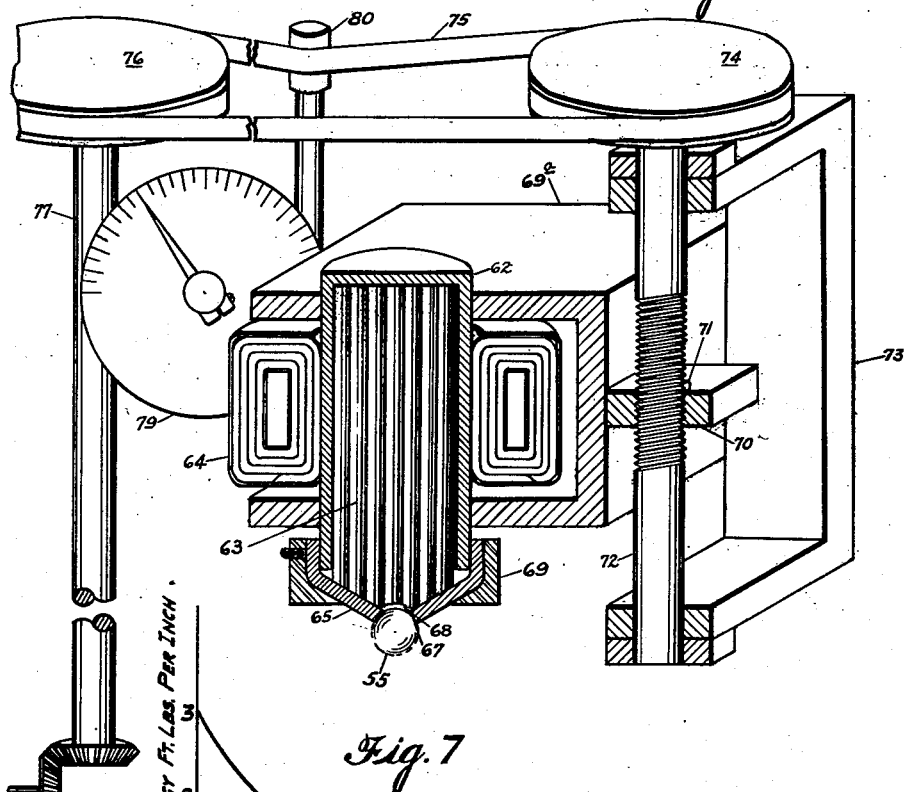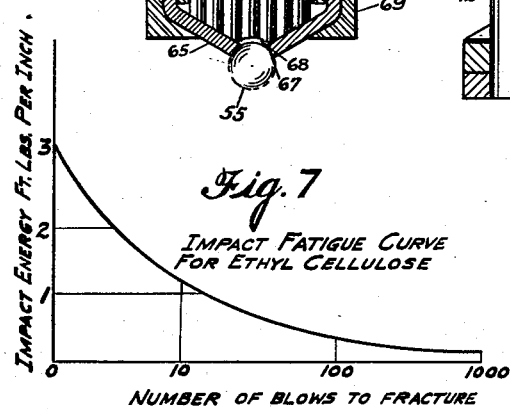

Patented Dec. 25, 1951

2,579,503

UNITED STATES PATENT OFFICE 2,579,503

IMPACT TESTING MACHINE

George Lubin, New York, N. Y., and Roswell R. Winans, West Caldwell, N. J.

Application February 26, 1945, Serial No. 579,819

5 Claims. (Cl. 73—12)

(Granted under the act of March 3, 1883, as amended April 30, 1928; 370 O. G. 757)

This invention relates to an instrument or machine for determining the fatigue strength and impact strength of materials such as plastics.

Heretofore in determining the impact strength of materials a machine of the "Izod" type, consisting of a weighted pendulum swung from a predetermined height, striking the test specimen at the point of its maximum velocity, was used. At that point the pendulum has a considerable excess of energy over that necessary to break the specimen and therefore does not indicate the amount of energy to initiate fracture. This is because it has been found that the impact strength as determined by an "Izod" type machine includes, in addition to (a) the energy to initiate fracture of the specimen, (b) the energy to propagate the fracture across the specimen, (c) the kinetic energy imparted to the broken ends of the specimen and (d) other energy losses due to friction, vibration and plastic deformation.

It is believed that the true impact strength of a material, such as plastics, is measured by the energy necessary to produce an incipient crack in the specimen (item (a) above) since, under service conditions, the smallest crack destroys or limits serviceability of a material such as molded plastic. Therefore it became desirable in testing materials such as plastics to devise a machine that measures this energy accurately, as distinguished from one that gives the sum total of the energies, (a) to (d) referred to above.

Existing machines for testing the impact strength of material, such as the "Izod" type test machine, measure the energy for complete fracture or cleavage of the material tested.

The object of this invention, therefore, is to determine the fatigue and impact strength of a material such as plastic by measuring the energy necessary to initiate fracture thereof.

Another object is to provide a test machine or instrument that can be used both to determine the impact strength and fatigue strength of a material such as a plastic.

A further object is to provide an automatic loading and feeding mechanism that applies a series of impact forces to a test specimen accurately.

The above objects, and other objects of this invention that will be made apparent herein, are attained by means of an illustrative embodiment of the invention shown in the accompanying drawings, in which Fig. 1 is a front elevation of an impact testing machine, showing a preferred embodiment of the invention;

Fig. 2 is a side elevation thereof;

Fig. 3 is an enlarged view in perspective showing the details of the specimen holder and cut-off switch;

Fig. 4 is a detailed view in perspective showing the conveyor buckets;

Fig. 5 is a section taken on line 5—5 of Fig. 2, showing the conveyor bucket picking up a ball;

Fig. 6 is an enlarged perspective view, partly in section, showing the electro-magnetic head; and Fig. 7 is a plot of data obtained with the impact testing machine.

Similar numerals refer to similar parts throughout the several views.

The apparatus includes a base or pedestal 1 on which there is mounted a rectangular frame comprising upright frame members 2—2 and a number of spaced horizontally extending cross members 3, 4, 5 and 6.

An adjustable base plate 7 is mounted slidably between the two upright frame members and can be raised or lowered by rotation of the two adjusting worm member 8—8, which are driven by a hand wheel 9. Clamps 58—58 are provided to secure the base plate firmly after adjustment.

A shield or screen 10 made of transparent material extends between the cross members 4 and 5 of the frame, as shown in Fig. 1.

A specimen holder is mounted on the base plate 7, as shown in Fig. 3, and comprises a housing 11 fitted with a lower block 12 and an upper clamp block 13, so as to grip the test specimen 14 firmly. A knob 15 is provided to facilitate clamping. Deflection shields 59—59 are attached to the base plate, as shown in Fig. 3.

A cut-off switch mechanism 16 is mounted on the base plate. This switch comprises an insulated holder 17 provided with a slot in which there is mounted slidably a cut-off plunger 18. A switch arm 19 projects laterally from the lower end of the plunger and overlaps a microswitch 20. A contactor element 21 is threaded in the end of the switch arm 19 and is adjustable relative to the microswitch 20 by means of the thumb piece on the end of the contact element.

A ball loading or feeding mechanism is provided. This includes a pair of endless sprocket chains 22 (Figs. 1 and 2) that form a conveyor belt extending between the lower and upper horizontal cross members 3 and 6 of the frame, and is mounted rotatably on these cross members by a pair of sprocket wheels 23—23 and 24—24 (see Figs. 1, 2 and 5). A countershaft 26 is mounted rotatably on the upper horizontal cross member 6 by means of a suitable bearing 27 and a similar shaft 28 (Fig. 5) is mounted on an extension 60 of the lower frame member 3 (Fig. 5).

The sprocket wheels 23 and 24 that carry the chains forming the conveyor are fixed on one end of each of these shafts. The opposite end of the lower shaft member 28 is provided with an additional sprocket wheel 29 from which a drive chain 30 extends, connecting to a drive motor (not shown). The upper shaft 26 also has fixed to its opposite end a sprocket wheel 31 on which there is mounted a drive chain 32. A bracket 61 extends below the upper cross member 6 of the frame and a third shaft 33 is mounted rotatably in this bracket. A sprocket wheel 34 is secured to one end of this third shaft 33 and receives the drive chain 32. The eccentric wheel 35 is secured to the opposite end of the drive shaft 33 so as to rotate therewith. This eccentric wheel has a cam surface 36 on its periphery and has eccentric arm 37 secured rotatably thereto.

A suitable number of buckets 38 are mounted at spaced intervals on the chains 22 forming the conveyor belt. These buckets, as shown in Fig. 4, have a concave carrying surface 39 and are each bifurcated to form the longitudinally extending slot 40.

Below the eccentric wheel and in the same plane therewith, a microswitch and housing 42 actuated by the follower arm and roller 43 is mounted on a bracket 41. A spring (not shown) in the microswitch holds the circuit normally open. The microswitch 42 is connected electrically to a relay 44 that controls the electromagnetic head 45.

A counting mechanism 46 is mounted on horizontal frame member 5. This counter is actuated by an arm 47, which projects into proximity with the endless sprocket chain 22 of the loading mechanism and is so arranged that the free end of this arm freely passes through the slot 40 of the bucket 38 when the buckets are empty, but is deflected by an object carried in the bucket sufficiently to cause registration on the counter 46.

An unloading finger is provided on the upper cross member 6 of the frame and consists of an arm 48 (Fig. 1) extending at an angle of approximately 45° so that the free end of such arm also is in proximity to the endless chain of the loading mechanism and positioned to pass through the slots 40 of the buckets 38 as they pass. Should the bucket carry an object such as a ball as indicated in Fig. 1, the unloading finger 48 deflects the ball from the bucket, rolling it into the receiver chute 49 as the bucket passes.

An inclined receiver chute 49 is fixed to the upper cross member by means of a clamp 50. The lower end of the chute feeds into a slightly inclined channel 51. This channel is mounted slidably on the frame by means of a sliding shoe 52 and fixed guide-plate 53.

The eccentric arm 37 is connected to one end of the sliding channel 51 (Fig. 1). It can thus be seen that rotation of the eccentric wheel 35 results in reciprocative motion of the sliding channel 51. A stop pad 54 is so positioned that the open end of the sliding channel 51 abuts said pad when said channel is in its extended position.

The electrical system of the machine includes cut-off switch 16, which is connected to a suitable drive-motor-control box (not shown). The microswitch 42 is fed from the power-supply source and is connected to the magnetic head 45 by the energizing relay switch 44 mounted on the top cross member of the frame. The specific electrical circuits employed are of the type used normally by electricians and are not further illustrated nor described.

The electromagnetic head 45 shown in Figs. 1, 2 and 6, includes an electromagnet having a characteristic of immediate demagnetization. The electromagnet shown in Fig. 6 comprises a jacket 62, preferably of a non-magnetic material such as brass, packed with soft iron wire 63. An energizing coil 64 encompasses the jacket. The lower end of said jacket is provided with a conically shaped centering piece 65 made of a non-magnetic material, preferably stainless steel. The opening 67 in the centering piece 65 is machined or formed to provide a spherical seating surface of sufficient size to seat balls varying in size from ¼ to 1½ inches in diameter. It will be noted from Fig. 6 that an air gap 68 is provided between the seated ball and the iron core and this air gap, which in practice is approximately $\frac{1}{16}$ inch, plus the conical shape of the soft iron core, gives the electromagnet the property of non-eccentric or axial demagnetization.

The conical form of the centering piece 65 is found to result in an extreme concentration of magnetic field flux in the center of the magnet that contributes to the efficient holding power of the electromagnet.

A shield 69 made of plastic or other non-magnetic material embraces the centering piece 65 throughout most of its surface and precludes the possibility of the ball being attracted elsewhere than to the spherical seating surface 67.

The electromagnet is mounted in a U shaped holder 69a (see Fig. 6). A lug 70 projects laterally from the web of the holder 69a and a threaded hole 71 provided in the lug receives the threaded adjusting shaft 72. The shaft is mounted rotatably in a rectangular housing 73 secured to the main frame of the machine. A pulley 74 is secured to the top of the shaft 72 and connects by means of a belt 75 to a second pulley wheel 76 secured to the drive rod 77 mounted in the channel of frame member 2 (Fig. 1). A hand wheel 78 actuates the drive rod 77, thereby raising or lowering the electromagnetic head 45.

A dial indicator 79, the pointer on which is actuated by a rack (not shown) attached to the magnet holder 69a engaging a pinion (not shown) fixed to the pointer shaft, is calibrated correspondingly to the various size balls used with the machine, i. e., in increments from ¼ to 1½ inches. Thus, by operating the hand wheel the proper setting of the electromagnetic head 45 is obtained when the pointer on the indicator 79 is opposite the number corresponding to the size of ball being used in the test. A belt tensioner 80 is mounted on the cross member 6.

OPERATION

The impact testing machine is designed to drop steel balls from the electromagnetic head 45 on to the test specimen 14 clamped in the specimen holder (Fig. 3). The machine can be used for single blow impact tests in which balls of selected sizes are dropped singly on to the specimen to determine its impact strength, or for multi-blow impact fatigue tests in which the automatic loading and feeding mechanism is employed to drop a selected series of balls on the specimen repeatedly until fracture occurs.

The single-blow test consists of dropping hardened steel balls from a predetermined height from the magnetic head 45 onto the test specimen 14 clamped in the specimen holder. The specimen holder is raised or lowered by cranking the adjusting worms 8—8 so that a predetermined height of drop can be obtained. In practice, the height is adjusted preferably between 12 and 36 inch limits, but any other height of drop can be used.

The specimen 14 is clamped in position in the specimen holder 11 by means of the clamp blocks 12 and 13, and knob 15. A standard "Izod" type specimen is used generally for the test and in practice consists of a ½ x ½ x 2½ inch sampling of the material to be tested, with a standard-size notch milled in the upper face.

The plunger 18 of the cut-off switch 16 (see Fig. 3) is adjusted so that its free end is in juxtaposition but spaced from the lower surface of the test specimen. The space between th specimen and the top of the rod is adjusted so that any load short of breaking will not deflect it sufficiently to touch the rod. The contact element 21 is then adjusted so that the microswitch 20 is closed. This cut-off switch is connected to the control box of the drive motor (not shown). It can thus be seen that when the specimen is broken or cracked, the deflection becomes great enough to depress the plunger 18, thereby actuating the microswitch, breaking the contact and stopping the machine.

The balls are dropped from the electromagnetic head 45 and strike the test specimen preferably .866 inches from its point of support by the specimen holder 11, such being the standard value of the "moment arm" employed in the "Izod" test.

The balls are made to fall on exactly the same spot for each test specimen, since a deviation of only $\frac{1}{32}$ inches on the moment arm would introduce an error of over 3 per cent.

This result is achieved by using the special electromagnetic head 45 for dropping the balls on the specimen. The energized electromagnet holds a ball 55 in the centering piece 65. When said electromagnetic head is de-energized, the ball is released instantly and falls in a straight and true path, since the air friction on a spherical ball is only a very small fraction of the total energy acquired by the ball in falling.

It has been found in practice that the employment of such electromagnetic releasing means avoids the errors obtained when mechanical means for dropping the balls are used, as for example, by rolling them off a chute. In practice the latter method gave an initial twisting to the ball, which, however slight, results in an erratic path of fall and consequent scattering. It is to be also noted that balls dropped from an ordinary electromagnet were found to fall non-uniformly since the magnet did not demagnetize centrally or co-axially when de-energized.

The spherical opening or seat 67 of the magnetic head of said centering piece 65 (see Fig. 6) is adapted to receive and hold by magnetic attraction one of a series of various-sized balls made of steel or other magnetic material. Preferably, hardened steel balls such as ball bearings are employed, but it is obvious that other materials can be used. In practice, said centering piece 65 of said magnetic head is designed to accommodate balls varying in size from ¼ inch to 1½ inches in diameter. The 1½ inch diameter ball has been found to be the largest diameter employable conveniently when using an "Izod" type of specimen, since it is common in the art to apply the impact blow .866 inches from the point of support of such specimen (see Fig. 3).

The electromagnetic head 45 is raised or lowered by turning the hand wheel 78. Such adjustability thereof is provided to maintain the height of drop constant when balls of various sizes are substituted during a given test. The electromagnetic head 45 is adjusted until the pointer on the dial indicator 79 is opposite the number corresponding to the size of ball used in a given test.

SINGLE-BLOW IMPACT TEST

In performing the single-blow impact test, the smallest size ball is first dropped on the specimen and the size of ball dropped is increased gradually until the specimen breaks. By such method the smallest ball that will just crack the specimen is determined, thereby indicating the energy necessary to produce incipient fracture of the material tested.

MULTI-BLOW IMPACT FATIGUE TEST

In using the machine of this invention for performing impact fatigue tests, the automatic loading device comprising the hopper 81, the conveyor chain 22 and the feeding troughs 49 and 51 and related mechanisms are employed. The test specimen 14 is mounted in the specimen holder 11 and the machine adjusted for a selected height of drop, as before.

The balls rebounding from the specimen 11 fall into the hopper 81 to be refed through the machine. The bottom of the hopper 81 is inclined and empties in a trough or chute 82 leading to the bottom of the bin 84 through which the chain conveyor runs. The ball is picked up by one of the slotted conveyor buckets 38 (see Fig. 5). The bucket carries the ball upwardly and intercepts and actuates the protruding end of the arm 47 of the counter 46. As previously described, the end of such arm 47 passes freely through the slot 40 in the bucket, when empty, but is deflected by a ball when carried in the bucket. By such arrangement the total number of impacts delivered to the specimen is recorded as the balls are fed from the hopper to the electromagnetic head 45.

The balls are carried farther upward by the conveyor until they are contacted by the end of the unloading finger 48. This finger, because of its angle of incidence, deflects the ball from the bucket 38 as the finger passes through the slot 40 in the bucket. The ball falls on the fixed inclined trough 49 and then rolls onto the sliding chute 51. The sliding chute 51 is actuated by the eccentric arm 37, which is mounted rotatably on the eccentric wheel 35. The eccentric wheel, which is in constant rotation by virtue of the drive chain 32 and sprocket wheel 34, reciprocates the sliding chute 51, pushing the end of this chute under the spherical opening 67 of the centering piece 65 of the electromagnetic head 45 at periodic intervals. The machine is so synchronized that a ball reaches the end of the sliding chute 51 at the instant the end of this chute moves directly under the magnet. At this time, the microswitch 42 is closed and the arm 45 of the microswitch rides against the periphery of the eccentric wheel 35. The electrical circuit leading from the main power supply through the relay switch 44 is closed and the electromagnetic head 45 energized. The ball is now picked up and centered by magnetic attraction into the spherical opening 67 of the centering piece 65 of the electromagnetic head and is there retained for the interval of time required for the sliding chute 51 to be pulled back by the rotating eccentric wheel 35, clearing said chute from under the magentic head. At this point the cam 36 has rotated to a position where it contacts the microswitch arm 43. The arm 43 is thereby actuated and opens the circuit leading to the electromagnetic head 45, which becomes de-energized instantaneously. The ball 55 is released, dropping upon the specimen 14, from which it rebounds into the hopper 81 and the cycle is repeated until fracture of the specimen occurs. Such end or fracture point is indicated by either an observed incipient crack or by marked deflection of the specimen. The latter results in the machine being stopped automatically by the actuation of the plunger element 18 of the switch 16 in the manner described previously. Thus, by the above sequence of operations, a record of the number of impacts required to fracture the specimen is obtained. By varying the speed of the power driving means, not shown, the automatic loading mechanism can be adjusted to deliver a ball to the magnet at desired intervals. The centralized or co-axial concentration of the flux due to the structure of the electro-magnet results in the ball being dropped without any initial rotation being imparted to it; because of this, balls can be dropped repeatedly on one point of impact on the specimen without appreciable dispersion. The impact energy as determined by the machine consists of the product of the height of drop in feet times the weight in pounds of the ball that causes initial fracture of the test specimen. The point at which such fracture is initiated can be determined in several ways. On transparent and translucent materials, the crack is visible to the eye as soon as it occurs. On opaque materials the crack can be detected by observing the rebound of the ball and the "ring" of the specimen when hit by the ball. In many cases the ball rebound changes from substantially vertical to an angle up to 45 degrees from vertical after the crack occurs, while the sound of the impact will ring flat. It will be understood, therefore, that upon the specimen deflecting downwardly due to fracture, the plunger 18 of the automatic stop switch 16 is depressed. Thus the machine, through action of the stop switch, determines the end point of the test without requiring continual observation of the specimen.

METHOD OF TESTING

Method I.—Repeated blow method

The first method consists of placing the specimen into the machine and dropping balls on it, starting with the smallest, until the specimen breaks. This locates the energy range of the material tentatively. After this range has been found, several sets of specimens are broken, using the same energy for each set, starting with the smallest ball that will just crack the specimen in one blow, and decreasing the size of the balls until the specimen withstands a thousand or more blows. The average number of blows required to fracture the specimen for each ball is then plotted on the log scale of semi-log graph paper against the impact energy. A curve (Fig. 7) is then drawn and the point at which the curve intersects the single-blow axis on the log scale is taken to be the single-blow impact strength of the material. The energy at which the curve becomes asymptotic to the number-of-blows-axis is the multiblow or fatigue strength. In operation, the energy value at approximately 1000 blows was assumed to be the fatigue strength. This assumption was made despite the fact that the true ultimate fatigue limit does not occur until $10^5$ or $10^6$ impact blows have been impressed, since the energy change between $10^3$ and $10^5$ or $10^6$ is only a small fraction of the total energy change between a single blow and $10^3$ blows or cycles, the assumed fatigue limit.

Method II.—Increased-blow method

In this method the specimen is struck by a ball somewhat smaller than that required to crack it in one blow, then the size of balls is increased until the specimen fails, each ball being dropped once. This determines the single-blow impact strength of the material, but the value thus obtained is lower than that of Method I above since there is some fatigue effect caused by the number of balls that has to be dropped on the specimen before fracture occurs.

Method III.—Statistical method

This method is the statistical method where groups of specimens are subjected to single-blow impacts of the same ball for each group and the percentage of specimens fractured by each size ball is determined. This method too determines the single-blow impact strength of the material.

To correlate the data between the single blow strengths, as obtained by the machine of this invention and the standard "Izod" type of machine, the specimen, in which initial fracture had occurred as a result of tests on the former were placed in the "Izod" machine and fractured or severed completely. The "Izod" strength resulting from this last test was then subtracted from the indicated strength obtained from an "Izod" machine test on an unfractured specimen. The difference was called the net "Izod" strength and was considered to indicate the amount of energy to initiate fracture in an "Izod" test since, in fact, it represented the difference between the energy required to fracture a specimen and that necessary to complete the cleavage of a specimen fractured initially. This was compared with energy required to initiate fracture in a drop ball test, as in the results obtained in the actual test of a laminated phenolic specimen:

(a) Single-blow strength ft./lb. per in. drop ball machine as determined from graph plot in Method I _____ 1.76
(b) Multi-blow strength ft./lb. per in. as determined in Method I_____ .43
(c) Impact strength as determined by "Izod" test _____ 4.86
(d) Impact strength of initially fractured specimen as determined by "Izod" test__ 4.38
(e) Difference between items (c) and (d)___ 0.48

Item (e) represents a result that can be compared with item (a), since as above stated they both are a measure of the energy required to fracture the material initially. This in turn is a measure of the utility of the material since, as previously stated, the smallest produceable crack in a specimen determines its strength and usefulness.

Since the machine of this invention determines by actual test the energy necessary to initiate fracture in a material as compared to the "Izod" equivalent, in which such result is arrived at only inductively or hypothetically, as above noted, the drop ball impact test method of this invention is more appropriate and more accurate than the "Izod" type of excess-swing pendulum test for impact strength determinations. Most of the errors inherent in the "Izod" type of machine are eliminated substantially by using the method of this invention.

The machine of this invention further determines accurately the impact fatigue strength of the specimen material and thus furnishes a reliable indication of the actual working stress of the material.

Various modifications and changes can be made in the subject device without departing from the scope of the invention.

The invention described herein may be manufactured and used by or for the Government of the United States of America for governmental purposes without the payment of any royalties thereon or therefor.

We claim:

1. In a machine for impact testing the strength of materials, means for releasably holding an impact weight such as a ball, said holding means comprising electro-magnetic means in association with a core of low-flux-retentivity material, a cone-shaped non-magnetic member adjacent to the end of said core and providing weight-seating means adapted to hold such weight separated from said core by an air gap, said non-magnetic member restricting the path of the field created by said electro-magnetic means to an axial center portion of the core whereby a non-eccentric concentration of flux is produced substantially at the center of said core, and focused at the center of said ball to permit free release of the ball without imparting to it initial rotation.

2. In a machine for impact testing the strength of materials, means for holding an impact weight releasably comprising electromagnetic means providing magnetic flux, a non-magnetic housing encasing said electromagnetic means, said housing having a weight-seating opening, and means for giving said flux a non-eccentric distribution over said opening.

3. In a machine for impact testing the strength of materials, means for holding releasably an impact weight, said holding means comprising electro-magnetic means in association with a core of low-flux-retentivity material, a non-magnetic member adjacent to the end of said core and providing weight-seating means adapted to hold a weight separated from said core by an air gap, said non-magnetic member restricting the path of the field created by said electro-magnetic means to an axial center portion of said member whereby a non-eccentric concentration of flux is produced substantially at the center of said member and focused at the center of said weight to permit free release of said weight without imparting to it initial rotation.

4. In a machine for impact testing the strength of materials, a framework, specimen supporting means mounted on said framework, conveyor means for carrying metallic spheres to a release point above said specimen supporting means, counting means for counting the spheres carried by said conveyor means past a given point, means for releasing a sphere from said conveyor means at said release point after it has been counted, said counting and releasing means being mounted on said framework, an electro-magnet mounted on said framework above said specimen supporting means, a reciprocating channel movable between said release point and said electro-magnet for guiding a released sphere to said electro-magnet, means for driving said conveyor means and reciprocating said channel, and means for deenergizing said electro-magnet actuated by said driving and reciprocating means after said channel is removed from under a sphere so as to permit such sphere to fall freely upon a specimen carried by said specimen supporting means.

5. In a machine for impact testing the strength of materials, a framework, specimen supporting means mounted on said framework, conveyor means for carrying metallic spheres to a release point above said specimen supporting means, counting means for counting the spheres carried by said conveyor means past a given point, means for releasing a sphere from said conveyor means at said release point after it has been counted, said counting and releasing means being mounted on said framework, an electro-magnet mounted on said framework above said specimen supporting means, a reciprocating channel movable between said release point and said electro-magnet for guiding a released sphere to said electro-magnet, means for driving said conveyor means and reciprocating said channel, and means for deenergizing said electro-magnet actuated by said driving and reciprocating means after said channel is removed from under a sphere so as to permit such sphere to fall freely upon a specimen carried by said specimen supporting means, and means for stopping said conveyor means responsive to initial fracture of such specimen.

GEORGE LUBIN.
ROSWELL R. WINANS.

REFERENCES CITED

The following references are of record in the file of this patent:

UNITED STATES PATENTS

| Number | Name | Date |
|---|---|---|
| 1,290,310 | O'Connor | Jan. 7, 1919 |
| 2,170,640 | Kenyon | Aug. 22, 1939 |
| 2,281,324 | Preston | Apr. 28, 1942 |
| 2,359,044 | McBride | Sept. 26, 1944 |

FOREIGN PATENTS

| Number | Country | Date |
|---|---|---|
| 486,533 | Great Britain | June 7, 1938 |